INVENTOR.
James R. Timmons

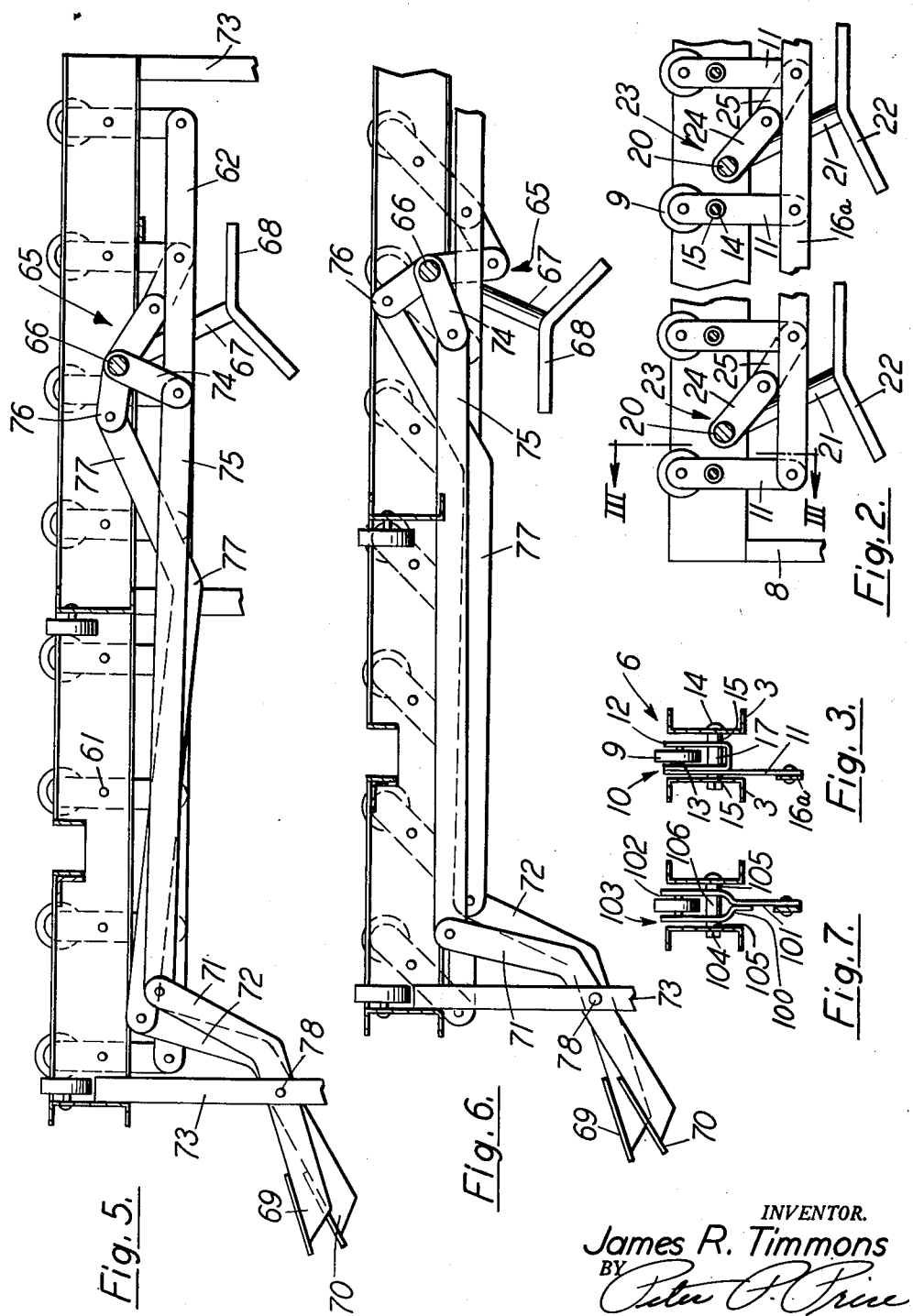

April 14, 1953     J. R. TIMMONS     2,634,843
CONVEYER SWITCH

Filed April 21, 1950     3 Sheets-Sheet 3

INVENTOR.
James R. Timmons
BY
Attorney

Patented Apr. 14, 1953

2,634,843

UNITED STATES PATENT OFFICE 2,634,843

CONVEYER SWITCH

James R. Timmons, Grand Rapids, Mich., assignor to The Rapids-Standard Company, Inc., Grand Rapids, Mich., a corporation of Michigan Application April 21, 1950, Serial No. 157,261

7 Claims. (Cl. 193—36)

The invention relates to conveyor construction and more particularly to a new type of switch for a conveyor whereby goods travelling along the conveyor may be allowed to continue along the conveyor or be directed onto a side or spur track.

In the design of switches for conveyors the primary objectives of design are to obtain a switch which is sturdy, simply constructed and capable of positively directing the articles in one direction or another. The switch construction herein disclosed is primarily designed for use on a conveyor on which the articles being transported are mounted on pallets moving along the conveyor, either by gravity or by manual manipulation. The use of my new type switch is not, however, limited to pallets but may be used with any type of article which is adapted to move along a conveyor on wheels spaced apart substantially the width of the conveyor.

One of the most serious problems in the design of conveyor switches is the provision of a simple means for positively directing the pallets or articles in one direction or the other at the switch. This means must be capable of positive operation even though the pallet or article is warped. The switches of the type contemplated by my invention operate by contacting the pallets with either one of two groups of wheels, each group set to direct the pallet in a different direction. Unless a substantial clearance is provided between the wheels aligned in one direction and the wheels aligned in another direction, whereby the pallets will be supported entirely by the wheels belonging to only one of these groups, the pallets may either be misdirected or stymied. To prevent the pallets from being impositively directed at the switch, it is necessary that the rollers or supporting wheels which are movable to direct the pallet or articles in one direction or the other be so mounted that they either positively contact or clear the pallet.

This positive movement must be incorporated in a frame structure which is heavy enough to support severe loads without flexing. If flexing of the frame occurs, the pallet or article frequently contacts rollers in two different directions, thus rendering the operation of the switch impositive. When, as in the case of my invention, the direction of the pallets or articles is determined by raising and lowering one of two groups of wheels, the vertically movable wheels, in their raised position, must be securely supported. The wheels must not be movable in their lowered or inoperative position by the loads travelling along the conveyor. This requires some type of locking mechanism. In my invention this locking action is inherent in the design of the operating mechanism whereby the wheels are simultaneously raised and locked into position without the necessity for additional parts or operations.

It is, therefore, a primary object of my invention to provide a conveyor switch adapted to effect positive direction of the pallets or articles even though these latter are extensively warped.

A further object of my invention is to provide a conveyor switch in which the design permits the use of a frame of such sturdy construction that the switch will sustain heavy loads without warping or flexing.

A further object of my invention is to provide a conveyor switch of mechanically simple design capable of economical manufacture.

These and other objects and purposes of my invention will be immediately seen by those acquainted with the design of materials handling equipment upon reading the following specification and the accompanying drawings.

In the drawings:

Figure 2 is a fragmentary elevation sectional view of my improved conveyor switch taken along the plane II—II of Figure 1.

Figure 3 is a sectional elevation view of my improved conveyor switch taken along the plane III—III of Figure 2.

Figure 5 is a sectional elevation view taken along the plane V—V of Figure 4 showing the movable wheels in raised or operating position.

Figure 6 is a sectional elevation view taken along the same plane as Figure 5 showing the movable wheels in lowered or inoperative position.

Figure 7 is a sectional view of my improved conveyor showing a modified design of the supporting cradle for the movable wheels.

Figures 1, 8, 9:
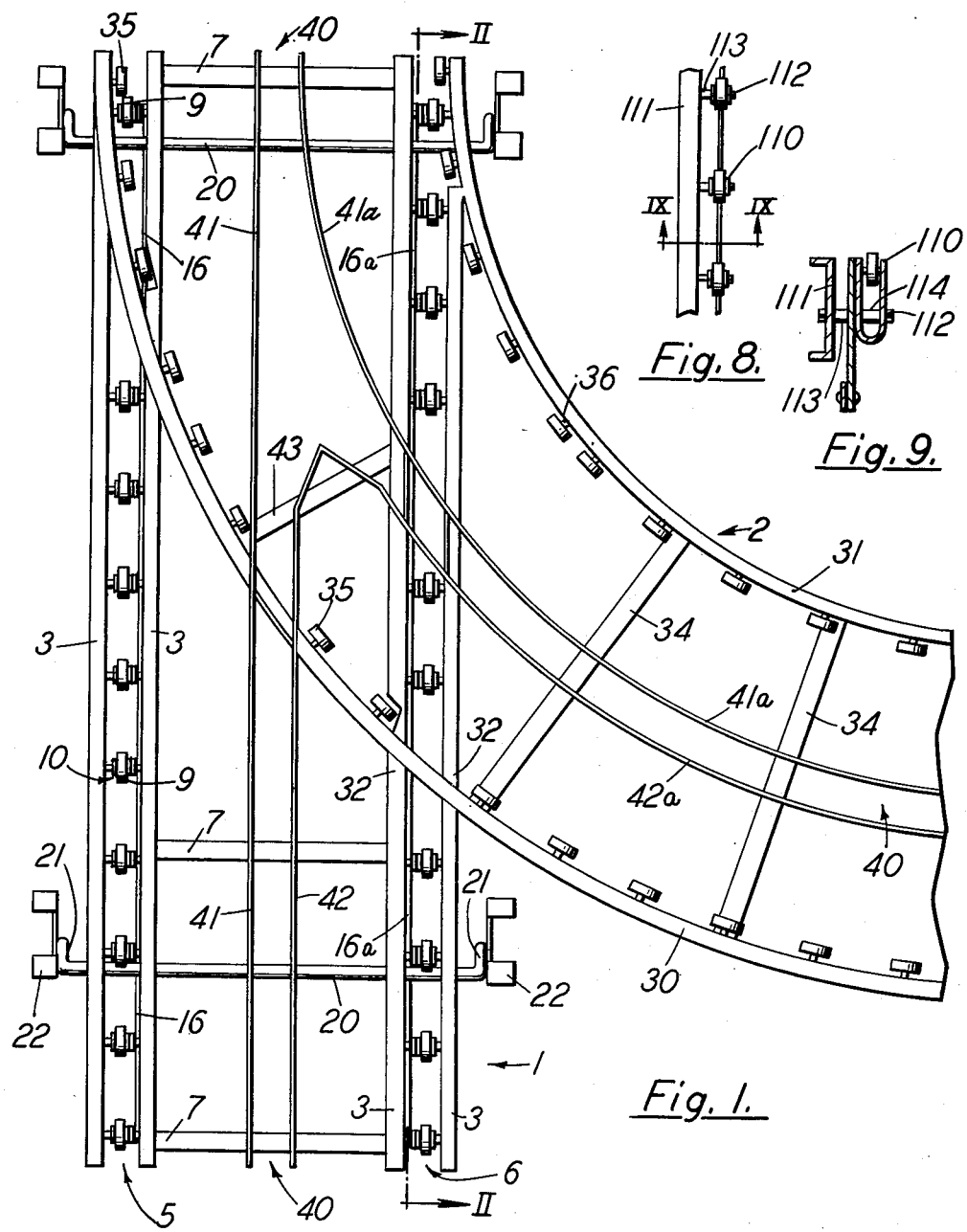
Figure 1 is a plan view of my improved conveyor switch.
Figure 8 is a fragmentary plan view of a modified mounting structure for the movable wheels.
Figure 9 is an end elevation view of the modified movable wheel mounting taken along the plane IX—IX of Figure 8.

In executing the objects and purposes of my invention I have provided a conveyor switch designed to be incorporated in a gravity conveyor system. The frame of the conveyor switch includes one track aligned with the main track of the conveyor and a secondary track extending away from the main conveyor track at an angle. The article supporting wheels on one of the tracks are each individually mounted in a cradle which in turn is pivotally mounted to the frame. The wheels, as so mounted, are raised and lowered by the pivotal movement of the cradle about its mounting to the frame. Further article supporting wheels are mounted on the other of the tracks, which wheels are designed to be above the movable wheels when the movable wheels are in lowered position and below the movable wheels when the movable wheels are in raised position. Articles moving along the conveyor and on to the switch will continue to travel along the conveyor or be diverted onto the secondary track, depending upon whether they are contacted by the stationary wheels or the movable wheels.

Referring to the drawings in greater detail, the numeral 1 indicates a main track, which at one end, is tangent to a curved branch or secondary track 2. The main track 1 consists of a bed frame having two pairs of parallel, spaced beams 3, each pair forming one side of the bed frame. Each of the pairs of beams 3 from one of the rails 5 and 6. The rails 5 and 6 are each spaced apart a substantial distance and are joined together to form a rigid unit by means of the cross members 7. The bed frame of the main track 1 is supported by legs 8 (Fig. 2) at each of its corners. Additional legs may be provided where such is necessary. Between the beams 3 of each of the rails 5 and 6, load supporting wheels 9 are individually mounted by means of the cradles 10.

The cradles 10 are each of identical construction, having an arm 11 supporting, at its upper end, a U-shaped saddle 12 (Fig. 3). The saddle 12 is mounted to one side of the arm 11 by any suitable means, such as welding, and receives within it one of the wheels 9 mounted for free rotation upon the axle 13. Below the wheel 9 the cradle 10 is pivotally mounted to the beams 3 of a supporting rail by means of a bolt 14. The cradles 10 are each maintained in properly spaced relationship to the beams 3 by means of the spacers 15. A spacer 17 supports the saddle 12 against collapse. The lower end of each of the arms 11 projects substantially below the mounting bolt 14. The cradles 10 mounted on the rail 5 are all connected together by a link 16 pivotally attached to the lower end of each of the arms 11 and extending lengthwise of and parallel to the rail 5. The cradles 10 mounted on the rail 6 are similarly operatively joined together by the link 16a.

Adjacent each end of the main track 1 a shaft 20 is rotatably mounted between the rails 5 and 6. On each end of each of the shafts 20 there is mounted a lever 21 having a treadle plate 22 on its free end. The shafts 20 are both connected to each of the links 16 and 16a by means of toggle units 23, each toggle unit 23 having links 24 and 25 (Fig. 2). When the shafts 20 are in one position, the toggle units 23 are substantially straight or open, forcing the arms 11 into a vertical, erected position whereby the wheels 9 are raised. As the shafts 20 are rotated, the toggle units 23 fold, moving the arms 11 into an inclined position, thus, lowering the wheels 9. The motion of the toggle units 23 is transmitted to each of the arms 11 by means of the links 16 and 16a. Either of the shafts 20 may be rotated by pressing on one side or the other of the treadle plate 22, thus pivoting the lever 21 and rotating the associated shaft 20. Whichever shaft 20 is thus caused to rotate, similar motion will be imparted to the other shaft 20 through links 16 and 16a. The toggle units 23 are so designed that they are never completely straightened whereby one of the toggle units could function as a lock against the other toggle unit.

By means of this structure all of the wheels 9 are simultaneously raised or lowered the same amount. Since the arms 11 are vertical in their raised position, the saddles 10 will not tend to pivot downwardly into their inoperative position under the weight of a pallet or other operating load placed upon them. The structure is designed to operate relatively stiffly, thus resisting the tendency of the wheels to be lowered by the lateral impact of the pallets or articles moving along the conveyor.

The secondary track 2 consists of a pair of curved rails 30 and 31 spaced apart the same distance as the outer of the beams 3 of the rails 5 and 6. The curved rails 30 and 31 are, at one end of the switch, tangent and rigidly attached to the outer of the beams 3. The rail 30 curves away from the rail 5 and passes through the inward of the beams 3 of the rail 5 by means of a notch. Both the beam 3 and the rail 30 are notched whereby a portion of each of them will remain intact. The beam 3 and the rail 30 are welded together at their point of intersection to provide a strong, rigid joint. Where the rail 30 intersects the beams 3 of the rail 6, the beams 3 and the rail 30 are each notched in a manner similar to that provided at the intersection of the rail 30 and the rail 5. The rail 30 is welded to each of the beams of the rail 6. Reinforcements may be provided where the rail 30 intersects each of the rails 5 and 6 to increase the strength of the frame. In the area where the rail 30 intersects the beams 5 and 6 of the main track 1, the movable wheels 9 and their supporting cradles 10 are eliminated to avoid interference between these wheels and the rail 30.

Where the rails 30 and 31 extend beyond the main track 1, they are rigidly joined together by the cross pieces 34. Legs are provided on the outward end of the secondary track 2 to support that end of the secondary track. The rails 30 and 31 are mounted at the same elevation as the rails 5 and 6, but the wheels 35 mounted on the rails 30 and 31 are so mounted that they are lower than the wheels 9 when the wheels 9 are in their erected position and above the wheels 9 when the wheels 9 are in their inoperative or lowered position. By means of this arrangement, a pallet entering the conveyor switch will, when the wheels 9 are in raised position, contact the wheels 9 only and, when the wheels 9 are in lowered position, contact the wheels 35 only. The wheels 35 are mounted on the rails 30 and 31 by any suitable means such as the bolts 36. The wheels 35 are so mounted that they are freely rotatable on the bolts 36.

The conveyor curve is provided with a Y-shaped central guideway 40 centered in each of the main track and the secondary track, respectively. The guideway 40 consists of a pair of spaced strips 41 and 41a, one following the main track 1 and the other curving to follow the secondary track 2, respectively. The strips 41 and 41a are mounted to the cross members 7 on the main track 1 and to the cross ties 34 on the secondary track 2. The guideway is completed by the strips 42 and 42a forming a somewhat V-shaped pattern spaced from both of the strips 41 and 41a. The strip 42 follows the main track 1 and the strip 42a follows the secondary track 2. The strip 42 is mounted to both the cross members 7 and the strip 42a is mounted to the cross ties 34. Where the guideway forks, a special support element 43 is provided which support element is mounted between the rail 30 and the inner of the beams 3 of the rail 6. Where the guideway 40 of the secondary track 2 intersects the rail 6 of the main track 1, one of the movable wheels 9 is deleted to prevent conflict between this wheel and the guideway.

Where the strips 41 and 42 intersect the rail 30, the rail 30 is notched the width and depth of the guideway 40 and the strips welded to the rail. The same construction is employed where the strips 41a and 42a intersect the beams 3 of the rail 6. In both cases the rail may be reinforced if necessary.

Figure 4:
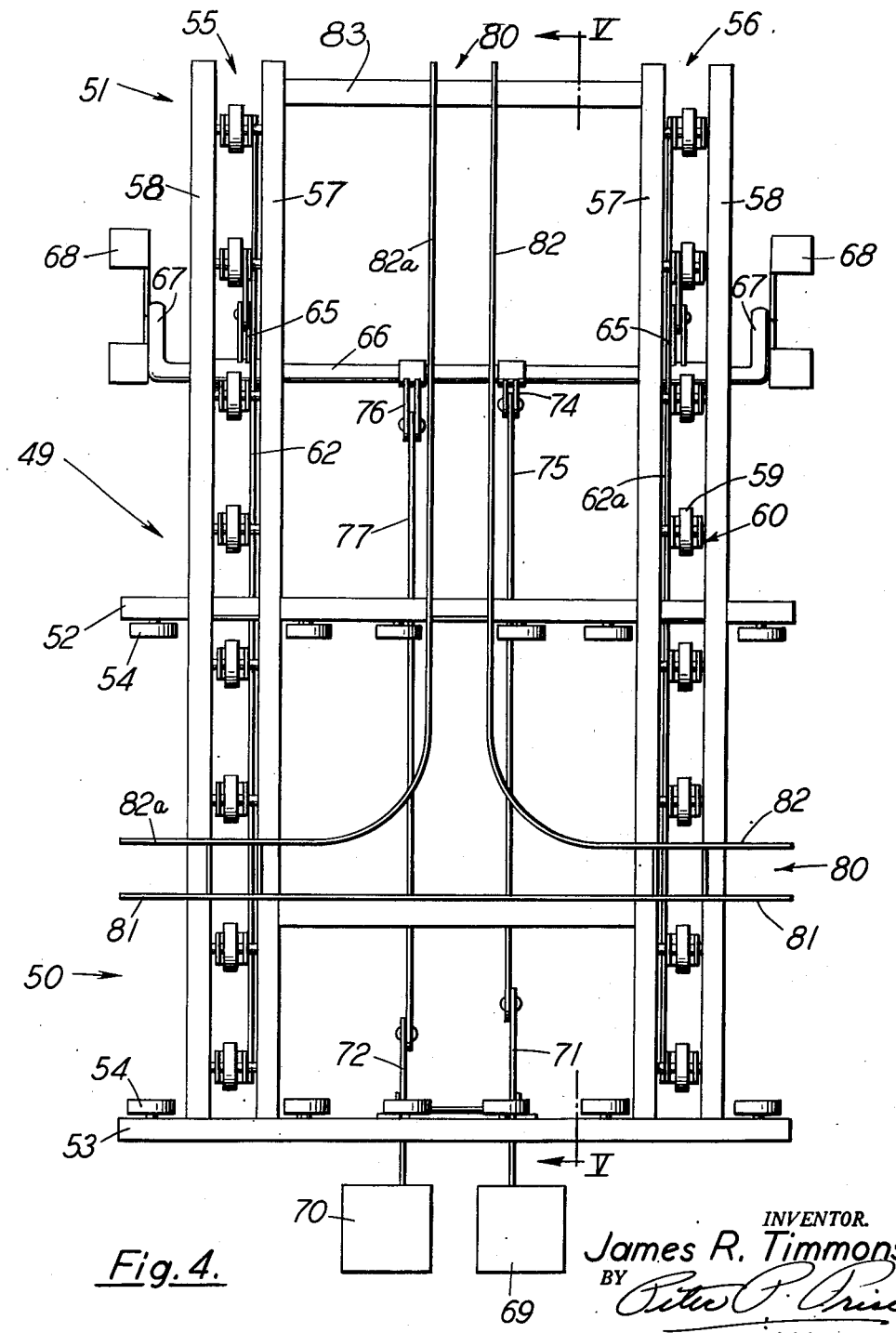
Figure 4 is a plan view of a modified form of my improved conveyor switch.

The same structural principles as described above may be employed to provide a right angle take-off type of switch 49 shown in Figures 4, 5, and 6. In the case of the right angle take-off, the secondary or spur track 51 leads off at a right angle to the main track 50. The main track 50 consists of a pair of spaced rails 52 and 53 each having spaced, freely rotatable, pallet supporting wheels 54 mounted thereon by means of bolts or other suitable fastening means. Intersecting the main track 50 at a right angle is the secondary track 51 consisting of a pair of spaced rails 55 and 56. The spaced rails 55 and 56 each consists of a pair of parallel, spaced beams 57 and 58. Where each of the rails 55 and 56 of the secondary track 51 intersect the rail 52, cutouts are provided in both the rail 52 and the rails 55 and 56. Thus, the rails at their intersections may each seat within the other and each maintain a portion of its structure intact. When these rails are welded together they form a rigid structure. The ends of each of the rails 55 and 56 are secured to the rail 53 by any suitable means such as welding.

Between the beams 57 and 58 of each of the rails 55 and 56, respectively, are mounted pallet or article supporting wheels 59 by means of the cradles 60. The design, structure and function of the cradles 60 are identical in every respect to the cradles 10. The cradles 60 are each individually mounted to their respective rails by means of a pivot bolt 61 (Figs. 5 and 6). The manner of mounting the cradles 60 to each of the rails 55 and 56 is identical to the mounting of the cradles 10 to the rails 5 and 6 including the use of spacers. The cradles 60 mounted on the rail 55 are operatively joined by the link bar 62 and the cradles 60 mounted on the rail 56 are operatively joined together by the link bar 62a. The bars 62 and 62a are each connected by means of the toggle linkage 65 (Figs. 5 and 6) to a rotatable shaft 66 mounted between the rails 55 and 56 at a point outwardly from the main track 50. One link of each of the toggle linkages 65 is rigidly attached to the shaft 66 for rotation with the shaft. The other link of each of the toggle linkages 65 is attached to one of the bars 62 and 62a whereby when the shaft is in one position of rotation, the toggle linkages will be substantially straight (Fig. 5) and the cradles 60 will all be moved into a vertical, erected position for raising the pallet supporting wheels 59 into their upward or operative position. Upon rotation of the shaft 66 to another position, the toggle linkages 65 will each be partially folded (Fig. 6) moving the bar 62 toward the shaft 66, causing all of the cradles 60 to pivot downwardly about their pivot bolts 61 for lowering the pallet supporting wheels 59 to their inoperative positive. Since the shaft 66 is operatively connected to both the bar 62 and the bar 62a, the pallet supporting wheels 59 along both of the rails 55 and 56 are all simultaneously raised or lowered.

The shaft 66 is equipped with an arm 67 and foot plate 68 on each end. The shaft 66 may be rotated either by manipulation of one of the arms 67 or through a linkage system from the treadles 69 and 70 projecting from one side of the main track 50. The arm 67 and foot plate 68 combination provides a means of actuating the spur take-off by an operator on one side of the main track 50. The treadles 69 and 70 provide a means for operating the spur take-off by an operator on the other side of the main track 50.

The treadles 69 and 70 are each mounted on an individual lever 71 and 72, respectively. Each of the levers 71 and 72 are shaped in the form of a shallow V and are pivotally attached by the bolt 78 to one of the legs 73 of the take-off spur frame. The shaft 66 is equipped with a downwardly extending arm 74 which in turn is connected to the lever 71 by means of the link rod 75. The shaft 66 is also equipped with an arm 76 mounted at substantial angle to the arm 74. The arm 76 is connected to the lever 72 by means of the slightly V-shaped rod 77. Each of the arms 74 and 76 are rigidly attached to the shaft 66 whereby pivotal movement of the arms 74 and 76 will rotate the shaft 66. Thus, when the treadle 69 is pressed downwardly, the rod 66 is rotated inwardly or toward the leg 73, moving the arm 76 outwardly or away from the leg 73. The outward movement of the arm 76 raises the treadle 70. By means of the toggle linkages 65 this rotation of the shaft 66 simultaneously causes the pallet supporting wheels 59 to be pivoted downwardly into inoperative position. When the treadle 70 is pressed downwardly the arm 76 is moved inwardly or toward the leg 73, moving the arm 74 outwardly or away from the leg 73, raising the treadle 69. This motion of the shaft 66 straightens out the toggle linkages 65, simultaneously causing the pallet supporting wheels 59 to be pivoted upwardly into their erect or operative position. Swinging the arms 67 by means of the foot plates 68 from one side to the other produces the same effect on all of the same parts.

The spur take-off is equipped with a T-shaped guideway 80 consisting of spaced strips 81, 82 and 82a. The spaced strips 82 and 82a are each bent around a 90° curve whereby each may serve as one wall of the guideway in both the main track 50 and the spur track 51. The strips 81, 82 and 82a are, in the area of the main track 50, mounted to the rails 55 and 56. The strips 82 and 82a along the secondary track 51, are mounted to the cross member 83 of the secondary track 51 and to the rail 52 of the main track 50. Where the guideway 80 passes through the rails 55 and 56 and the rail 52, cutouts are made in these rails to accommodate the guideway. These rails may be reinforced in the vicinity of each of these cutouts. The strip 81 is mounted in the main track 50 parallel to the portions of the strips 82 and 82a serving as one wall of the guideway in the main track. The strip 81 is rigidly mounted to the rails 55 and 56.

Operation

Both forms of the switch, the spur curve and the spur take-off, are designed to be used as part of a conventional gravity conveyor system of the type having two spaced parallel rows of wheels for supporting the articles moving along the conveyor. Whether the spur curve or the spur take-off is used is a matter of choice, depending upon the result desired. In general, the spur curve is used when it is desired to place a fork in the track and the spur take-off is used when a spur track, bypass or off the conveyor work station is desired.

Articles, such as pallets, entering the spur curve or the switch shown in Figures 1, 2, and 3 will continue to travel along the main track 1 or move onto the secondary track 2 depending upon the position of the wheels 9. If the wheels 9 are in their raised position, the pallets will continue along the main track and pass over the wheels 35 of the secondary track 2 without contacting them. If the wheels 9 are lowered to their inoperative position, they will then be below the level of the wheels 35 of the secondary track. Thus, when the articles or pallets enter the switch they will be supported entirely upon the wheels 35 and thus will be guided along the secondary track 2. Since the articles or pallets will automatically follow the path traced by the wheels supporting them, they will move along the main track or along the secondary track depending upon the alignment of the supporting wheels. Under all normal operating circumstances no other guiding means, either automatic or manual is necessary. Thus, the guideways 40 and 80 are actually only safeguards against occasional displacement of the pallets. They may be eliminated without interference with the normal operation of either the switch shown in Figures 1, 2 and 3, or the spur take-off shown in Figures 4, 5 and 6. When the guideways 40 and 80 are used, they guide the pallets by restricting or channeling the movement of some type of depending stud mounted on each pallet. By providing shafts 20 at each end of the switch and on each side of the main track 1, the wheels 9 may be raised and lowered from either side of the main track 1 and from either side of the secondary track 2. In addition, the wheels 9 may be raised and lowered from either end of the switch.

The operation of the spur take-off shown in Figures 4, 5 and 6 is quite similar to the operation of the switch shown in Figures 1, 2 and 3. The major difference lies in the fact that the movable wheels, when in raised position, divert the pallets or articles onto the secondary track 51 rather than directing them along the main track 50.

When the movable wheels 59 are in lowered or inoperative position, pallets moving along the main track 50 will be supported entirely by the wheels 54. Thus, the pallets or articles will move past the spur or secondary track 51 and continue along the main track 50. When it is desired to direct the pallet or article onto the secondary track 51, the pallet or article is moved along the main track 50 until it is centered in relation to the secondary track 51. The movable wheels 59 are then raised, lifting the pallet or article entirely off the wheels 54 of the main track 50. The pallet or article may then be moved onto the secondary track 51. As soon as the pallet or article has cleared the movable wheels 59, they may again be lowered so that the articles on the main track may either pass through the spur take-off or another one brought into position to be diverted onto the secondary track. By providing the foot plates 68 and treadles 69 and 70, the wheels 59 may be raised and lowered from either side of the secondary track 51 or from either side of the main track 50.

In the case of both the switch having the curved secondary track and the spur take-off, the arms used to raise and lower the movable wheels are designed to be perpendicular when the wheel are in raised, operating position. Thus, irrespective of the vertical load, imposed upon these arms, this load will be transmitted to the bolts anchoring the cradles to the rails. Since the cradles supporting the wheels are vertical, the axles for the wheels and bolts supporting the cradles are vertically aligned. Thus, the load vector is vertical and passes through the cradle supporting bolts. This eliminates any tendency for the cradles to pivot downwardly under their vertical loading. The horizontal thrust created by the movement of the pallets or articles along the conveyor will not pivot the wheels downwardly because of the stiffness of the operating mechanism. This is in part created by the forces necessary to initiate folding of the toggle linkages from their substantially straight position. It is also in part a result of the mechanical advantage gained by spacing the connection of the cradles to the link interconnecting the cradles farther from the cradle supporting bolts than the wheels.

By making the wheels 9 and 54 each vertically movable an equal and substantial distance, there is either positive contact with or positive clearance of the pallets or articles moving along the conveyor. The amount of vertical movement is sufficient to prevent difficulties arising by reason of warped or slightly flexible pallets or articles. Some warping of pallets is a common occurrence and, unless sufficient clearance is provided to compensate for this condition, portions of these pallets will contact wheels aligned in two different directions causing malfunction of the switch. By pivoting each of the wheels through an arc of substantial length, the necessary vertical displacement is made possible.

Modifications

The cradle has been described as an arm having a Y-shaped wheel receiving saddle anchored to one side of its upper end. This cradle may be constructed of two strips 100 and 101 (Fig. 7) welded together at their lower ends and spaced apart at their upper ends to provide a wheel receiving pocket 102. The resulting cradle 103 is mounted in a manner identical to the cradles 10, using a bolt 104 and spacers 105 on each side of the cradle and a spacer 106 to prevent collapse of the pocket 102.

Where the loads to be carried by the switch are not too great, the use of the parallel beams for mounting the cradles 10 may be changed by eliminating one of the beams (Figs. 8 and 9). In this construction the cradle 110 is mounted to the single supporting beam 111 by means of a bolt 112. The cradle 110 is properly spaced from the beam 111 by means of a spacer 113 surrounding the bolt 112. The cradle is supported against crushing by the spacer 114. The bolt 112 is provided with a shoulder abutting the beam 111 whereby the bolt may be rigidly attached to the beam 111 while at the same time leaving the cradle 110 free to pivot about the bolt.

These and other modifications may be made without departing from the principle of my invention. Each of these modifications is to be considered as included in the following appended claims unless the claims by their language expressly provide otherwise.

I claim:

1. In means for use in a conveyor for directing articles moving along the conveyor onto one of two tracks, the combination comprising: a main frame including two pairs of spaced, substantially parallel rails, one pair of said rails forming a main track and the other pair of said rails forming a secondary track, said main track and said secondary track intersecting each other and having an area common to both of said tracks; a plurality of spaced, freely rotatable article supporting wheels mounted along each rail of one of said tracks; a plurality of spaced arms associated with each of said rails of said other track in the area common to both of said tracks, each of said arms having an upper and a lower end; means for pivotally mounting each of said arms to said rails intermediate the ends of said arms; a freely rotatable article supporting wheel mounted to the upper end of each of said arms; a first link bar pivotally attached to the lower end of each of said arms common to one of said rails of the other of said tracks; a second link bar pivotally attached to the lower end of each of said arms common to the other of said rails of the other of said tracks; means for connecting said first link bar and said second link bar and for simultaneously moving said link bars parallel to said rails of said other track whereby said arms will be caused to pivot about their mounting means for raising and lowering the wheels at the upper ends of said arms.

2. In means for use in a conveyor for directing articles moving along the conveyor onto one of two tracks, the combination comprising: a main frame including two pairs of spaced, substantially parallel rails, one pair of said rails forming a main track and the other pair of said rails forming a secondary track, said main track and said secondary track intersecting each other and having an area common to both of said tracks; a plurality of spaced, freely rotatable article supporting wheels mounted along each rail of one of said tracks; a pair of parallel, spaced beams forming each of the rails of said other track; a plurality of spaced arms associated with each of said rails of said other track in the area common to both of said tracks, each of said arms having an upper and a lower end; means for pivotally mounting each of said arms between the beams of said rails intermediate the ends of said arms; a freely rotatable article supporting wheel mounted to the upper end of each of said arms; a first link bar pivotally attached to the lower end of each of said arms common to one of said rails of the other of said tracks; a second link bar pivotally attached to the lower end of each of said arms common to the other of said rails of the other of said tracks; means for connecting said first link bar and said second link bar and for simultaneously moving said link bars parallel to said rails of said other track whereby said arms will be caused to pivot about their mounting means for raising said wheels at the upper end of said arms to a position above the wheels on said one track and for lowering said same wheels to a position below the wheels on said one track.

3. A switch for a conveyor, the combination comprising: a first and a second track, said second track intersecting said first track and having an area common with said first track; a plurality of article supporting wheels mounted on said first track; in the area common to said first track and said second track a plurality of wheels individually, pivotally mounted on said second track for vertical movement; the maximum upward position of said wheels on said second track being above said wheels on said first track and the maximum downward position of said wheels on said second track being below said wheels on said first track; means for pivotally moving all of said wheels on said second track simultaneously.

4. A switch for a conveyor, the combination comprising: a frame having a straight main track and an arcuate secondary track tangent at one of its ends to said main track; said secondary track having a pair of spaced, parallel rails; a plurality of freely rotatable, article supporting wheels mounted on said rails of said secondary track; said main track having a pair of spaced, parallel rails; each of said rails of said main track including a pair of spaced parallel beams; a plurality of spaced arms having an upper end and a lower end; a portion of said plurality of arms each intermediate of its said ends individually, pivotally mounted between the beams of each of the rails of said primary track; a freely rotatable wheel mounted at the upper end of each of said arms; a first link bar pivotally attached to the lower end of each of said arms mounted on one of said rails of said main track; a second link bar pivotally attached to the lower end of each of said arms mounted on the other of said rails of said main track; means for simultaneously reciprocably moving said first link bar and said second link bar parallel to said rails whereby said upper ends of said arms will be raised and lowered; said wheels on said arms, at their upper limit of travel being above said wheels on said secondary track and said wheels on said arms, at their lower limit of travel, being below said wheels on said secondary track.

5. A switch for a conveyor, the combination comprising: a frame having a main track and a secondary track substantially perpendicular to said main track and intersecting said main track; said main track including a pair of spaced rails; freely rotatable, article supporting wheels mounted on each of said rails of said main track; said secondary track having a pair of spaced, parallel rails; each of said rails of said secondary track including a pair of spaced, parallel beams; a plurality of spaced arms having an upper end and a lower end; a portion of said plurality of arms, each intermediate of its said ends, individually, pivotally mounted between the beams of each of the rails of said secondary track; a freely rotatable wheel mounted at the upper end of each of said arms; a first link bar pivotally attached to the lower end of each of said arms mounted on one of said rails of said secondary track; a second link bar pivotally attached to the lower end of each of said arms mounted on the other of said rails of said secondary track; means for simultaneously, reciprocably moving said first link bar and said second link bar parallel to said rails whereby said upper ends of said arms will be raised and lowered; said wheels on said arms, at the upper limit of travel being above said wheels on said main track and said wheels on said arms, at their lower limit of travel, being below said wheels on said main track.

6. A switch for a conveyor as set forth in claim 5 wherein said means for simultaneously moving said first link bar and said second link bar is a shaft rotatably mounted between the rails of said secondary track; means for rotating said shaft; a pair of toggle linkages each having one of its links rigidly mounted to said shaft and the other of its links pivotally attached to one of said link bars whereby rotary motion of said shaft will be translated into simultaneous, lineal motion of said first link bar and said second link bar.

7. A switch for a conveyor as set forth in claim 5 wherein said means for simultaneously moving said first link bar and said second link bar is a shaft rotatably mounted between the rails of said secondary track; a pair of levers rigidly attached to said shaft; said levers radially extending from said shaft at a substantial angle to each other; a pair of treadles mounted on said main track and aligned with said secondary track; a rod connecting each of said treadles to the radially outward end of one of said levers whereby movement of said levers will rotate said shaft; a pair of toggle linkages each having one of its links rigidly mounted to said shaft and the other of its links pivotally attached to one of said link bars whereby rotary motion of said shaft will be translated into simultaneous, lineal motion of said first link bar and said second link bar.

JAMES R. TIMMONS.

References Cited in the file of this patent

UNITED STATES PATENTS

| Number | Name | Date |
|---|---|---|
| 1,022,823 | Buck | Apr. 9, 1912 |
| 1,102,161 | Moore | June 30, 1914 |
| 1,352,811 | Hunter | Sept. 14, 1920 |